United States Patent
Dar

(10) Patent No.: US 10,102,513 B2
(45) Date of Patent: Oct. 16, 2018

(54) INTEGRATED ONLINE AND IN-STORE SHOPPING EXPERIENCE

(71) Applicant: Walmart Apollo, LLC, Bentonville, AR (US)

(72) Inventor: Murad Dar, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 469 days.

(21) Appl. No.: 14/814,737

(22) Filed: Jul. 31, 2015

(65) Prior Publication Data

US 2016/0034879 A1 Feb. 4, 2016

Related U.S. Application Data

(60) Provisional application No. 62/031,401, filed on Jul. 31, 2014.

(51) Int. Cl.
*G06Q 20/00* (2012.01)
*G06Q 20/20* (2012.01)
(Continued)

(52) U.S. Cl.
CPC .......... *G06Q 20/202* (2013.01); *G06Q 20/12* (2013.01); *G06Q 20/208* (2013.01);
(Continued)

(58) Field of Classification Search
CPC ......... G06Q 20/20; G06Q 30/00; G06Q 30/02
(Continued)

(56) References Cited

U.S. PATENT DOCUMENTS 5,761,071 A 6/1998 Bernstein et al.
6,119,935 A * 9/2000 Jelen ..................... B62B 3/1408
235/383

(Continued)

FOREIGN PATENT DOCUMENTS

CA 2458636 A1 3/2003
DE 10133392 A1 1/2003
(Continued)

OTHER PUBLICATIONS

Information Kiosk for Use in Electronic Commerce: Factors Affecting its Ease of Use and Usefulness, Tung, Information Management Research Centre, 14 Bled Electronic Commerce Conference, 2001.
(Continued)

*Primary Examiner* — Oluseye Iwarere
(74) *Attorney, Agent, or Firm* — McCarter & English, LLP; David R. Burns

(57) ABSTRACT

Systems and methods for integrating online and in-store shopping are disclosed. The systems include a cashier station located in a store. The cashier station has a register, a product ID input device, and a screen accessible to a customer at the cashier station. An online site configured to facilitate ecommerce transactions between users and the store is also provided. The cashier station is in communication with the online store whereby recommended products are presented to the customer on the screen in response to the input of a product ID at the cashier station allowing the customer to make additional related purchases from the online site contemporaneously with the in-store purchase.

18 Claims, 4 Drawing Sheets

US 10,102,513 B2
Page 2

(51) Int. Cl.
*G07G 5/00* (2006.01)
*G07G 1/06* (2006.01)
*G07G 1/14* (2006.01)
*G07G 1/00* (2006.01)
*G06Q 30/06* (2012.01)
*G06Q 20/12* (2012.01)

(52) U.S. Cl.
CPC ....... *G06Q 30/0631* (2013.01); *G07G 1/0045* (2013.01); *G07G 1/06* (2013.01); *G07G 1/14* (2013.01); *G07G 5/00* (2013.01)

(58) Field of Classification Search
USPC ............ 705/21, 26.7, 14.25; 725/60
See application file for complete search history.

(56) References Cited

U.S. PATENT DOCUMENTS

| | | | |
|---|---|---|---|
| 2003/0158796 A1* | 8/2003 | Balent | G06Q 10/087 705/28 |
| 2004/0140352 A1* | 7/2004 | Walker | G06O 20/20 235/383 |
| 2005/0098625 A1* | 5/2005 | Walker | G06Q 20/209 235/381 |
| 2006/0011716 A1* | 1/2006 | Perkowski | G06Q 30/02 235/375 |
| 2006/0202009 A1* | 9/2006 | Austin | G06Q 10/08 235/375 |
| 2008/0228568 A1 | 9/2008 | Williams et al. | |
| 2008/0251582 A1* | 10/2008 | Nguyen | G06Q 20/20 235/449 |
| 2009/0250515 A1* | 10/2009 | Todd | A47F 9/046 235/383 |
| 2010/0030578 A1* | 2/2010 | Siddique | G06Q 10/0637 705/3 |
| 2011/0153406 A1* | 6/2011 | Mackin | G06Q 30/02 705/14.35 |
| 2011/0238512 A1* | 9/2011 | Doty | G06Q 20/204 705/17 |
| 2011/0264553 A1* | 10/2011 | Yarvis | G06Q 30/02 705/26.7 |
| 2011/0264554 A1* | 10/2011 | King | G06Q 30/02 705/26.8 |
| 2012/0197744 A1* | 8/2012 | Rose | G06Q 20/202 705/17 |
| 2012/0246684 A1* | 9/2012 | Yarvis | G06Q 30/02 725/60 |
| 2013/0006742 A1* | 1/2013 | Richard | G06Q 30/0236 705/14.25 |
| 2013/0046597 A1* | 2/2013 | Fennell | G06Q 30/0226 705/14.23 |
| 2013/0215116 A1* | 8/2013 | Siddique | G06Q 30/0643 345/420 |
| 2013/0256395 A1* | 10/2013 | Barkan | G06Q 20/00 235/375 |
| 2013/0304578 A1* | 11/2013 | Kannan | G06Q 30/0261 705/14.54 |
| 2013/0313316 A1* | 11/2013 | Jones | G06Q 20/204 235/383 |
| 2014/0089116 A1* | 3/2014 | Argue | G06O 30/0268 705/21 |
| 2014/0095285 A1* | 4/2014 | Wadell | G06Q 30/00 705/14.25 |
| 2014/0144979 A1* | 5/2014 | Lyman | G06O 30/0282 235/375 |
| 2014/0175167 A1* | 6/2014 | Argue | G06O 30/0633 235/383 |
| 2014/0214572 A1* | 7/2014 | Cancro | G06Q 20/208 705/21 |
| 2014/0258051 A1* | 9/2014 | Bostwick | G06Q 20/203 705/28 |
| 2014/0291396 A1* | 10/2014 | Molisimo | G06K 7/1447 235/383 |
| 2016/0034879 A1* | 2/2016 | Dar | G06Q 20/202 705/21 |
| 2017/0270584 A1* | 9/2017 | Chow | G01S 19/14 |

FOREIGN PATENT DOCUMENTS

| | | |
|---|---|---|
| EP | 1396595 A1 | 3/2004 |
| WO | 200101300 A1 | 1/2001 |
| WO | 2002054314 A1 | 7/2002 |
| WO | 2003096178 A1 | 11/2003 |

OTHER PUBLICATIONS

E-commerce and delivery, Okholm et al., European Commission, DG Internal Market and Services, 2013.

* cited by examiner

INTEGRATED ONLINE AND IN-STORE SHOPPING EXPERIENCE

RELATED APPLICATIONS

This application claims priority to U.S. Provisional Application Ser. No. 62/031,401 filed on Jul. 31, 2014, the disclosure of which is incorporated by reference herein in its entirety.

BACKGROUND

Retail stores sell a large variety of products to customers. Many times these customers may be looking for multiple related products or such related products that may be available but the customer may not be aware of them.

For retailers, these related products present additional sales opportunities that can be lost in at least one of two ways. First, given limited shelf space and logistical support, not all related items are carried in the store. This means that even when the customer is aware that they have a need for the related product, they do not have the opportunity to purchase the product. Second, the customer may not be aware of the need of the related product at the time they make an in person purchase. In this case, even if in stock at the location, the customer may not purchase the related product.

Accordingly, there is a need to provide information to customers, at the point of sale, of items and products related to a product being purchased. There is yet a further need for systems and methods to provide information regarding related products.

SUMMARY

Embodiments described herein provide a system and method for advantageously integrating online and in-store shopping. The system and method provide for a computerized improvement to the functioning of a computer system by automatically providing suggested products in response to scanned products in the physical store. The functionality of automatically providing suggested items reduces the burden on the servers and database(s) by reducing the number of queries performed to search for products related to the scanned product and improving the speed and efficiency of the system by reducing the burden on the servers and databases.

Exemplary embodiments described herein present a system including a server; a database; and a cashier station located in a store. The cashier station includes a POS controller, an optical scanning device; a receipt printer, and a display. The optical scanning device is operatively coupled to the POS controller and scans an optical machine readable representation of a product to be purchased. The optical scanning device decodes a unique product identifier encoded in the optical machine readable representation are transmits the unique identifier to the POS controller. The POS controller transmits the unique product identifier to the server along with a location of the store where the product was scanned. The server receives the product identifier and the location, and queries the database for recommended products based on the scanned product and the location of the store where the product was scanned; and transmits recommended products information to POS controller, which controls the display to render the recommended products on the display. The POS controller can control the display to display option to purchase recommended products; processes purchase of recommended product; and controls the display to display a total amount due after purchase of recommended product. The payment for the total amount due is tendered, and the receipt printer, operatively coupled to the POS controller, prints receipt for the purchased order.

Exemplary embodiments described herein present a method for integrating online and in-store shopping, the system comprising: scanning, via an optical scanning device operatively coupled to a POS controller, an optical machine readable representation of a product to be purchased. The optical scanning device decoding, a unique product identifier encoded in the optical machine readable representation. The POS controller transmitting, the unique product identifier and location of store where the product was scanned to a server. The server receiving, the unique product identifier of the scanned product. The server querying, a database for products recommended based on the scanned product and location of store where product was scanned. The server transmitting to a display operatively coupled to the POS controller, information of the recommended products. The display receiving information of the related products from the server. The display displaying information of the related products. The display processing, on the display, purchase of related product. The display displaying the total amount due after purchase of related product. The cashier station, tendering the payment of total amount due. The receipt printer a receipt in response to payment.

In exemplary embodiments, the optical scanning device is a barcode scanner.

In exemplary embodiments, the database includes a user database, a product database and an inventory reporting system.

In exemplary embodiments, the recommended products are those previously purchased by others contemporaneously with the product whose product identifier was input at the cashier station by other customers.

In exemplary embodiments, the recommended products are those suggested by the manufacturer for purchase with the product whose product identifier was input at the cashier station.

In exemplary embodiments, the recommended products are located in the store where the product is scanned, in a different store located at a predetermined distance from the store where the product was scanned, or available through an online store.

In exemplary embodiments, the display is controlled the by the POS controller to display an option to pick up recommended product in-store.

In exemplary embodiments, the display is controlled by the POS controller to display an option to input an alternative delivery address.

Any combination and/or permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Some embodiments are illustrated by way of example in the accompanying drawings and should not be considered as a limitation of the invention.

DETAILED DESCRIPTION OF EXEMPLARY EMBODIMENTS

Described in detail herein are methods, and systems associated with integrating online and in-store shopping. In exemplary embodiments, products can be recommended to user on a screen located at a cashier station as the cashier scans products being purchased by the customer/user. The cashier station is in communication with the server hosting an online store which facilitates e-commerce transactions between users and the store at the cashier station and in a single transaction with physical products being purchased in the store. In exemplary embodiments scanning a product at a cashier station invokes the server to query a database for recommended products based on the scanned product and transmits information regarding the recommended products the cashier station which are presented to the user on a display.

The following description is presented to enable any person skilled in the art to create and use systems, related methods associated with integrating online shopping and in-store shopping using a cashier station. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that example embodiments of the present disclosure may be practiced without the use of these specific details. In other instances, well-known structures and processes are shown in block diagram form in order not to obscure the description of example embodiments with unnecessary detail. Thus, the present disclosure is not intended to be limited to the embodiments shown, but is to be accorded the widest scope consistent with the principles and features disclosed herein.

Figure 1:
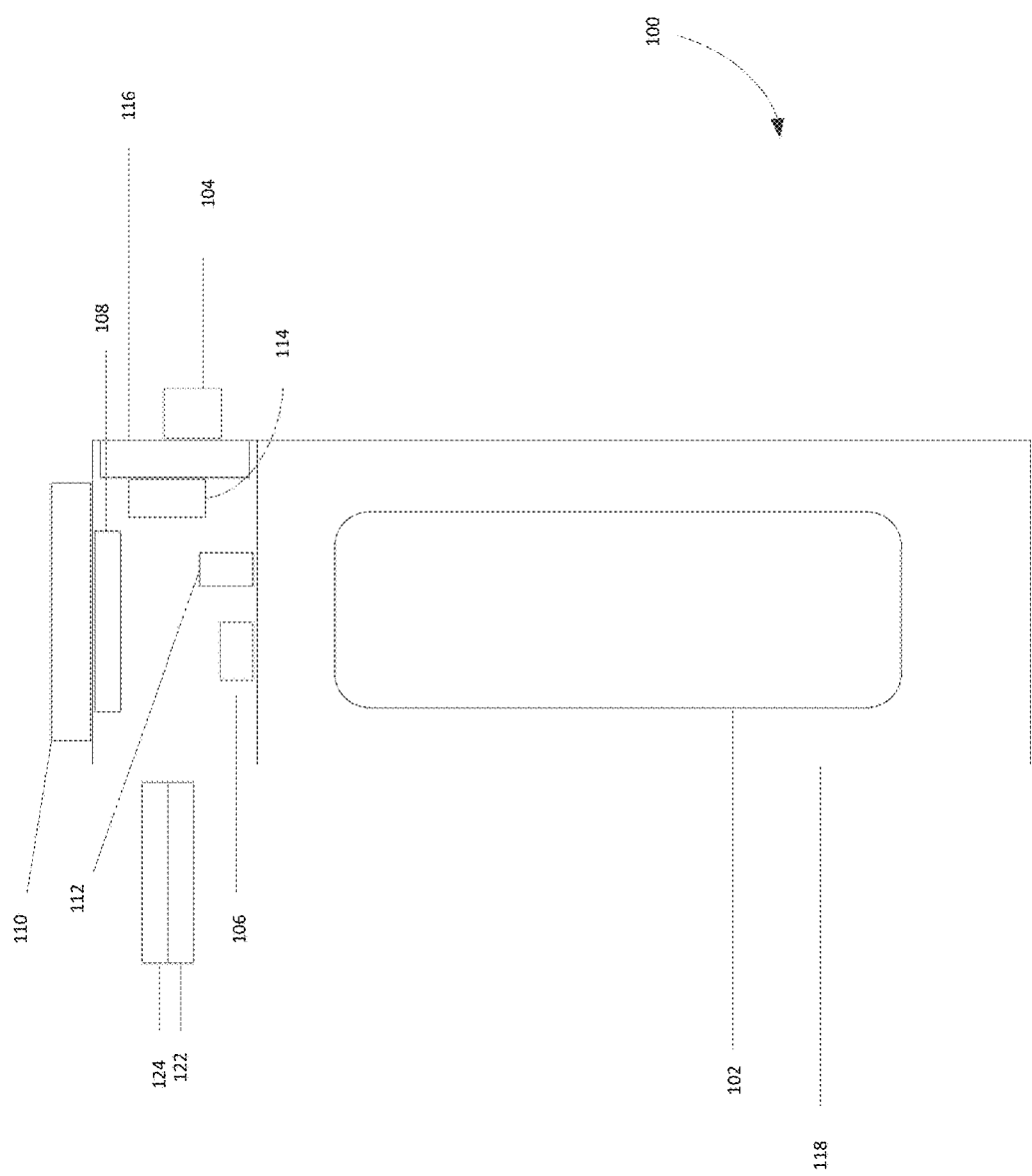
FIG. 1 is a block diagram showing cashier station including example cashier station components, according to example embodiment.

FIG. 1 illustrate a cashier station 100 that includes cashier station components disposed on a sales floor inside a store. The cashier station 100 can be used by a cashier (or customers for self-service cashier stations) to process transactions for customers. In the example embodiment in FIG. 1 the cashier station 100 includes belt 102, belt cabinets 118, a display 104, a receipt printer 106, a keyboard 108, a cash drawer 110, a scan gun 112 a card reader 114, a cashier display 122, a POS controller 124 and an optical scanner 116.

The POS controller 124 may be operatively coupled to the display 104, the receipt printer 106, the keyboard 108, the scan gun 112, the card reader 114, the cashier display 122 and the optical scanner 116. The POS controller 124 may communicate with a server to facilitate recommendation of products in response to scanning of product identifiers at the cashier station 100.

The belt 102 may be conveyer/endless belts disposed in the belt cabinets 104, which may also include rollers (e.g., friction and drive rollers) and a drive motor. The driver motor can control one or more of the rollers to rotate the belt to provide a transport for moving items from one end of the belt cabinet 104 to an opposite end of the belt cabinet 104. For example, the belt 102 can be driven to move items placed on the belt towards the optical scanner 108. The belt cabinets 104 can have a rectangular structure having side and bottom walls. Respective ones of the belts 102 can extend along a top portion of each of the belt cabinets 104. In addition, cashier station component can be disposed on or in one or more of the belt cabinets 104. For example, in example embodiments, at least one of the belt cabinets 104 can support the card reader 114, the optical scanner 116, as well as any other suitable cashier station components.

The display 104 may be a computer monitor operatively coupled to a POS controller 124 of the cashier station 100 and may display one or more graphical user interfaces. The display 104 may be operatively coupled to the keyboard 108, card reader 114, optical scanner 116 and scan gun 112. The graphical user interfaces can be rendered on the display to display information regarding items intended to be purchased along with information regarding completing the transaction and any other suitable information. In exemplary embodiments, the display 104 may be in communication with the POS controller 124 which may transmit product information about recommended products available at the customer's current location or in a store in a nearby location. In exemplary embodiments, upon reading the product identifier from the optical scanner 116 or scan gun 112, the display 104 may display various products available for purchase to the recommended to the customer/user based on the purchase of the initial product. In exemplary embodiments the keyboard 108 may be a multi-touch input system for the customer/user to enter information onto the display 104. In exemplary embodiments, the customer may select a recommended product using the keyboard 108 on the display 104 to read further information related to the recommended product. In exemplary embodiments the customer may select the recommended product for purchase using the keyboard 108 on the display 104. If the customer selects the related product for purchase the price of the product may be added into the payment amount displayed on the display 104. In exemplary embodiments, the customer/user can interact with the display 104 via a touch screen interface on the display.

The cashier display 122 may be a computer monitor operatively coupled to a POS controller 124 of the cashier station 100 and display one or more graphical user interfaces. The cashier display 122 may be only visible to the cashier. The cashier display 122 may be operatively coupled to the keyboard 108, card reader 114, optical scanner 116 and scan gun 112. The cashier display 122 may help facilitate transactions at the cashier station 100. In exemplary embodiments the keyboard 108 may be a multi-touch input system for the cashier to enter information onto the cashier display 122.

The receipt printer 106 may be operatively coupled to the cashier station 100 a printer configured to print receipts for completed customer/user transactions. The receipt printer 106 can be operatively coupled to the POS controller 124. The POS controller 124 can send information and instructions to the receipt printer 106 to instruct the receipt printer 106 to print receipts for transactions. In exemplary embodiments, the receipts may have an order identifier for the related product order whereby the customer/user can modify the related product order, in the online store, by using the order identifier on the receipt.

The keyboard 108 can be operatively coupled operatively coupled to a POS controller 124 and cashier station 100 and may be a multi-touch input system for customer/user to enter information onto the display 104. The keyboard provides functionality of I/O services receiving input from user input. In some embodiments, the keyboard 108 can include an integrated card reader that allows a cashier to swipe a customer/user's card.

The cash drawer 110 may be a storage system for holding monetary funds customers use to pay for their transactions. The cash drawer can include an electromechanical lock and/or an electromagnetic lock to selectively lock and unlock the cash drawing in response control signals. For example, when a customer/user pays for a transaction with cash, the cashier can input the tender type and amount into the keyboard and a control signal can be transmitted to the lock of the cash draw to allow the cash drawer to open and allow the cashier to place the money in the cash drawer and retrieve any change owed to the customer/user.

The card reader 114 may be a magnetic card reader operatively coupled to a POS controller 124 and cashier station 100 configured to read encoded information from magnetic stripes of payment cards. The magnetic reader may decode the encoded information and transmit the decoded information. A customer/user or cashier may use the card reader to input tender information cashier station 100 to complete a purchase of one or more items by the customer/user. While an example embodiment has been illustrated as including a magnetic card reader, those skilled in the art will recognize that other types of readers can be utilized instead of, or in addition to, the magnetic card reader. For example, in example embodiments, the car reader can include near field communication (NFC) or Radio Frequency Identification (RFID) reader capability to wireless interact with a customer/user's payment type.

The optical scanner 116 may be operatively coupled to the cashier station 100 and may be a barcode scanning machine configured to read optical machine-readable representations. The optical scanner 116 can be configured to scan encoded information from machine-readable representations. The optical scanner 116 may decode the encoded information and transmit the decoded information to the POS controller 124, or may in the alternative, transmit the encoded information to the POS controller 124, which may decode the encoded information. A customer/user or cashier may use the optical scanner 116 to input product and/or loyalty/reward information into the cashier station for use when processing a transaction for the customer/user. For example, the optical scanner 116 can be configured to scan barcodes or QR codes associated with items to be purchased by a customer/user and/or can scan customer/user loyalty/rewards cards/tags. The encoded information in the optical machine readable representation may include a product ID. The optical scanner 116 may decode the product ID and transmit the product ID to a database or the optical scanner 116 may transmit the encoded product ID to the database which may decode the product ID.

The scan gun 112 may be operatively coupled to the cashier station 100 and may be a handheld optical scanning machine configured to read optical readable representations labeled on the products intended to be purchased. The scan gun 112 may be semi-portable where users can hold the scan gun and scan optical readable representations labeled on products without placing the products on the cashier station 100. The scan gun 112 can be configured to scan encoded information from machine-readable representations. The scan gun 112 may decode the encoded information and transmit the decoded information to the POS controller 124, or may in the alternative, transmit the encoded information to the POS controller 124, which may decode the encoded information. The encoded information may include product ID. The scan gun 112 may decode the product ID and transmit the product ID to a database or the scan gun 112 may transmit the encoded product ID to the database which may decode the product ID. The scan gun 112 can be used to input item and/or loyalty/reward information into the cashier station 100 for use when processing a transaction for the customer/user. For example, the scan gun 112 can be configured to scan barcodes or QR codes associated with items to be purchased by a customer/user and/or can scan customer/user loyalty/rewards cards/tags.

In exemplary embodiments, a user (e.g., a cashier or a customer) may use the cashier station 100 to complete a sales transaction at a physical store location. For example, in some embodiments, the cashier station can be operated by an employee of the store (e.g., a cashier), and in some embodiments, the cashier station can be self-checkout station, where a customer can complete a transaction without require an employee of the store. In exemplary embodiments, the user may scan product identifiers for products to be purchased using the optical scanner 116 or the scan gun 112 at the cashier station 100. In exemplary embodiments, the POS controller 124 may communicate with the server to retrieve products recommended for the customer/user to purchase based on the scanned product and the geographic location of the store. The recommended products may displayed on the display 104, and can be located in the physical store, another physical store near the location of the physical store at which the transaction is being performed, and/or can be available through an online store. For embodiments where a cashier is scanning the product identifiers, the customer may interact with the display 104 to purchase the recommended products as the product identifiers of the physical products are being scanned to be added to the transaction. For embodiments where the cashier station is a self-checkout station, the customer can scan product identifiers and can interact with the display 104 to purchase the recommended products as the product identifiers of the physical products are being scanned to be added to the transaction.

Figure 2:
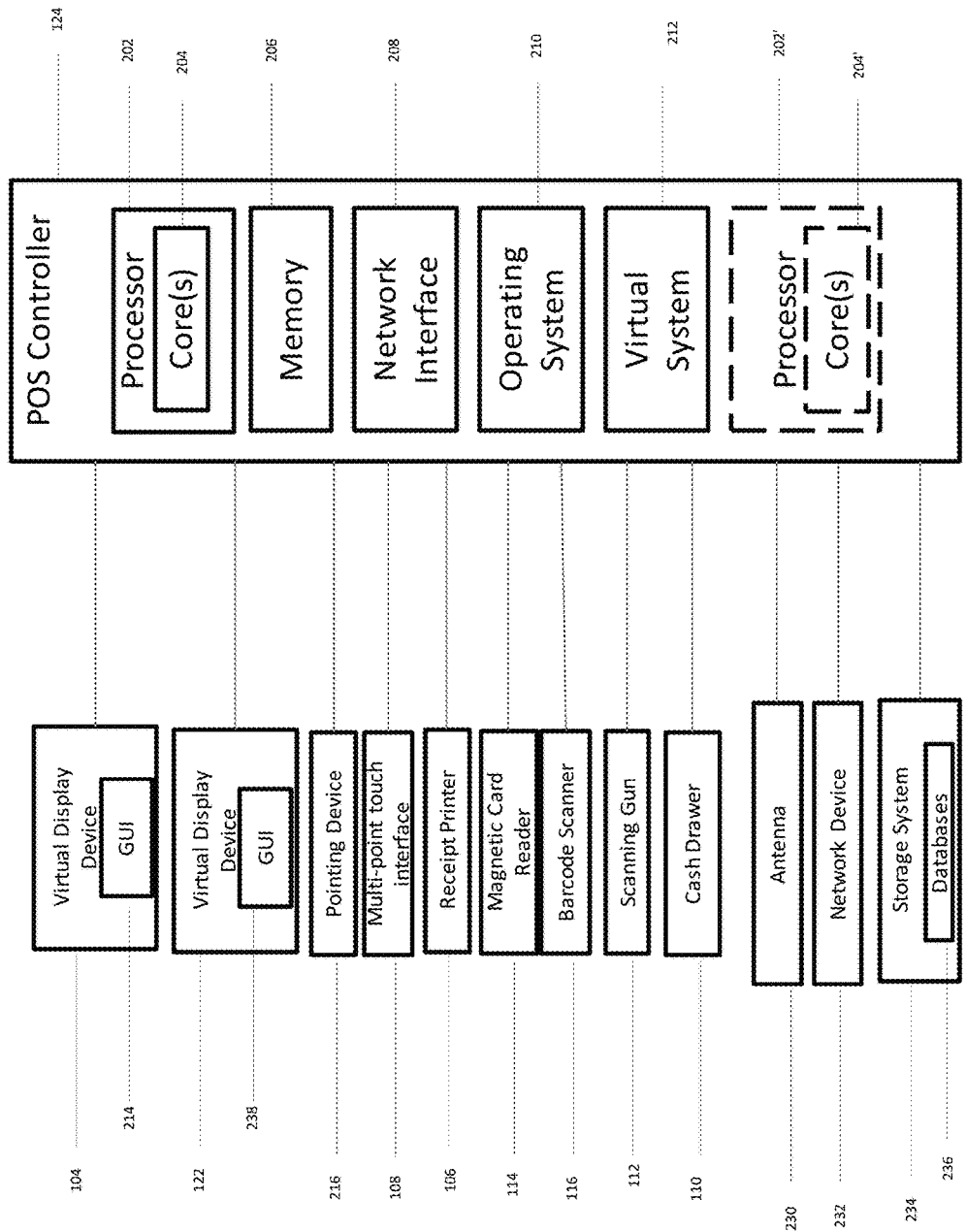
FIG. 2 is a block diagram of an example computing system of a cashier station in accordance with example embodiments of the present disclosure.

FIG. 2 is a block diagram of an example POS controller 124 that may be used to implement exemplary operations of the cashier station 100 in accordance with the present disclosure. The POS controller 124 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 206 included in the POS Controller 124 may store computer-readable and computer-executable instructions or software for implementing exemplary operations of the point-of-sale terminal. The POS Controller 124 also includes configurable and/or programmable processor 202 and associated core(s) 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling cashier station 100 components operatively coupled to the POS Controller 124. Processor 202 and processor(s) 202' may each be a single core processor or multiple core (204 and 204') processor.

Virtualization may be employed in the POS Controller 124 so that infrastructure and resources in the POS Controller 124 may be shared dynamically. A virtual machine 212 may be provided to handle a process running on multiple processors so that the process appears to be using only one computing resource rather than multiple computing resources. Multiple virtual machines may also be used with one processor.

Memory 206 may include a computer system memory or random access memory, such as DRAM, SRAM, EDO RAM, and the like. Memory 206 may include other types of memory as well, or combinations thereof.

A user (e.g., a cashier or customer/user) may interact with the POS Controller 124 through components of the cashier station 100 that are operatively coupled to the POS Controller 124 including, a visual display device 104 or 122 such as a computer monitor, which may display one or more graphical user interfaces 214 or 238. The POS Controller 124 may include other I/O devices for receiving input from a user, for example, the card reader 114, the optical scanner 116, display 104, the cashier display 122, the keyboard 108, the cash drawer 110, the scan gun 112, and/or the receipt printer 106, as described herein.

The POS controller 124 may also include one or more storage devices 234, such as a hard-drive, CD-ROM, or other computer readable media, for storing data and computer-readable instructions and/or software that implement exemplary of the cashier station 100. Exemplary storage device 234 may also store one or more databases for storing any suitable information required to implement exemplary embodiments. For example, exemplary storage device 234 can store one or more databases 236 for storing information such as transaction information, cashier information, product information, and/or any other suitable information. The databases may be updated manually or automatically at any suitable time to add, delete, and/or update one or more data items in the databases.

The POS controller 124 can include a network interface 208 configured to interface via one or more network devices 232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 230 to facilitate wireless communication (e.g., via the network interface) between the computing device 200 and a network. The network interface 208 may include a built-in network adapter, network interface card, PCMCIA network card, card bus network adapter, wireless network adapter, USB network adapter, modem or any other device suitable for interfacing the computing device 200 to any type of network capable of communication and performing the operations described herein.

The POS controller 124 may run any operating system 210, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 200 and performing the operations described herein. In exemplary embodiments, the operating system 210 may be run in native mode or emulated mode. In an exemplary embodiment, the operating system 210 may be run on one or more cloud machine instances.

Figure 3:
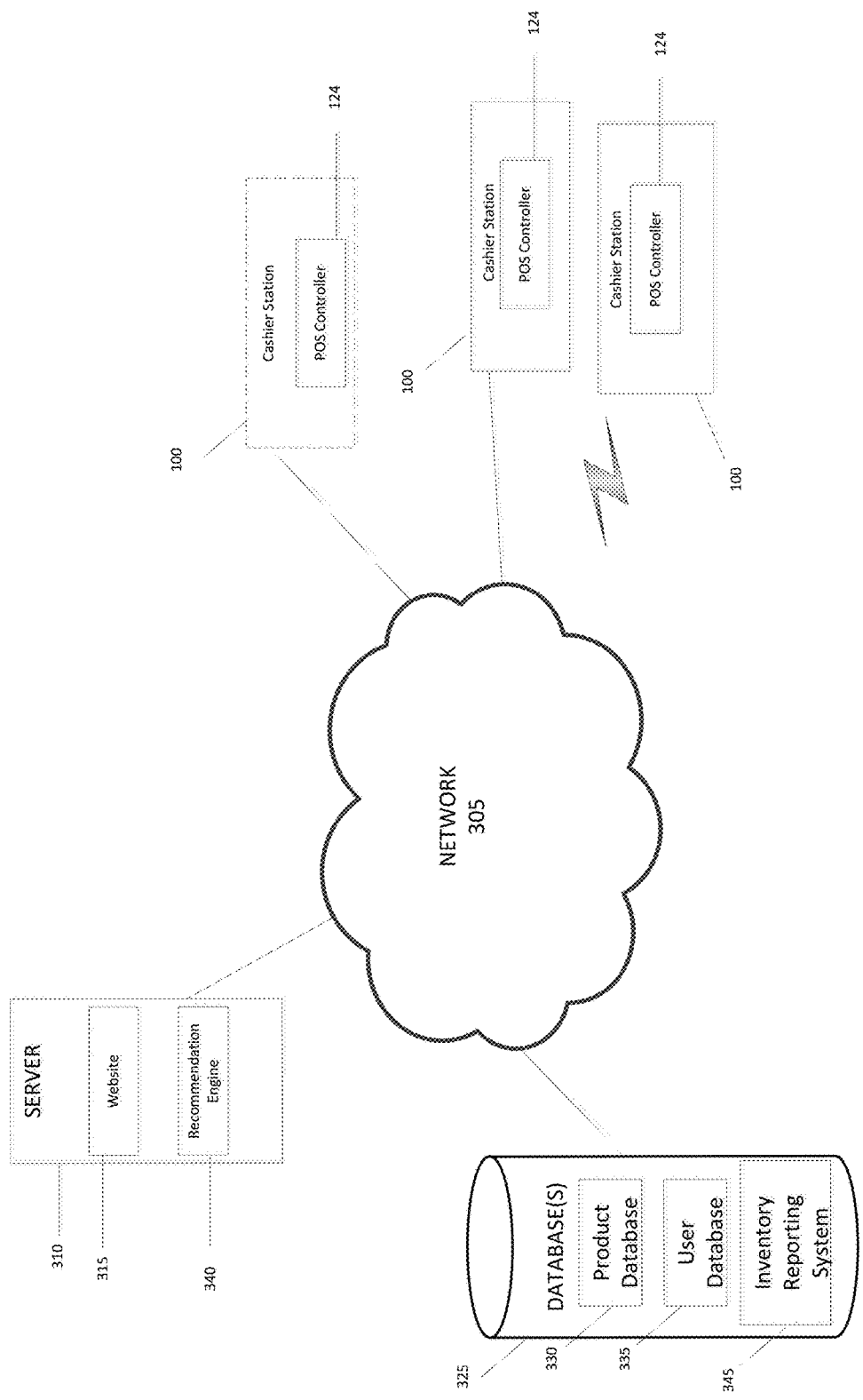
FIG. 3. illustrates an exemplary environment through which the cashier station communicate with other devices.

FIG. 3 illustrates a network diagram depicting a system 300 for integrating online and in-store shopping, according to an example embodiment. The system 300 can include a network 305, a cashier station 100 including a POS controller 124, a server 310, and the database(s) 325. Each of the a network 305, the POS controller 124, the server 310, and the database(s) 325 is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The POS controller 124 may comprise, but is not limited to, cash registers, work stations, computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. The cashier station 100 may be part of a store infrastructure and aid in performing various transactions related to sales and other aspects of a store. Being part of a store's infrastructure, the cashier station 100 may be installed within the store or they may be installed or operational outside of the store. For example, the POS controller 124 of the cashier station 100 may be a mobile device that a store employee or customer/user can use outside of the store to perform transactions or other activities. Similarly, the POS controller 124 of the cashier station 100 may be a mobile device that can be used within the store, and is not physically installed or attached to one particular location within the store. The POS controller 124 of the cashier station 100 can be operable coupled to one or more components described in relation to POS Controller 124 shown in FIG. 2.

The cashier station 100 may also include various external or peripheral devices operatively coupled to the POS controller 124 to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

The POS controller 124 may connect to network 305 via a wired or wireless connection. The cashier station 100 may include one or more applications or systems such as, but not limited to, a sales transaction application, a cashier performance application, a customer/user review application, a user interface application, a checkout lane parameter system, and the like. In an example embodiment, the cashier station 100 may perform all the functionalities described herein.

In another embodiment, the POS controller 124 may perform some of the functionalities, and server 310 performs the other functionalities described herein. For example, POS controller 124 may generate the user interface including a graphical representation of one or more products related to the scanned product, while server 310 may query the databases to retrieve related product information available for sale in the store the customer/user is located, a nearby store, or an online-store.

The server 310 may host the online store 315 and a recommendation engine 340. The recommendation engine 340 can communicate with the database 325 to retrieve products to recommend to customers based on scanned product identifiers at the cashier station 100 and/or geographic location of the store at which the transaction is being performed. In exemplary embodiments the POS controller 124 may transmit the location of the store to the server 310. In exemplary embodiments, the recommendation engine 340 may communicate the store location to the database 325.

The database(s) 325 may store data related to the products and users as described herein. The database(s) include the product database 330 and the user database 335. The product database 330 may include an inventory management system 345. In exemplary embodiments, the inventory management 345 system may store inventory data for all physical stores and online-store. In exemplary embodiments, the database 325 may receive a query request from the server 310 including the product identifier of a scanned product and location of the store in which the customer/user scanned the product. The database 325 may query the user database 335 to search for products purchased contemporaneously with the scanned product using the product identifier. In exemplary embodiments, the database 325 may query the product database 330 to search for products recommended by the merchant of the scanned product using the product identifier. The database may combine the results of the queries to form a list of recommended products found in the user database 335 and the product database 330. In exemplary embodiments, the database 325 can query the inventory management system 345 using the store location of where the product was scanned, for availability of the recommended products. In exemplary embodiments, the inventory management system 345 may query for availability of recommended products, in the store where the product was scanned, a store near by the store where the product was scanned, and/or through the online store. The database(s) 325 may transmit the available recommended products to the server 310

Each of the server 310 and database(s) 325 can be connected to the network 305 via a wired connection. Alternatively, one or more of the server 310 and databases 325 can be connected to the network 305 via a wireless connection. Server 310 comprises one or more computers or processors configured to communicate with the POS controller 124 and/or the database(s) 325, via network 305. Server 310 hosts one or more applications or websites accessed by the cashier station 100 and/or facilitates access to the content of database(s) 325. Server 310 also may include online-store website 315 described herein. Database(s) 325 comprise one or more storage devices for storing data and/or instructions (or code) for use by server 310, and/or POS cashier station 100. Database(s) 325 and server 310 may be located at one or more geographically distributed locations from each other or from the cashier station 100. Alternatively, database(s) 325 may be included within server 310.

Figure 4:
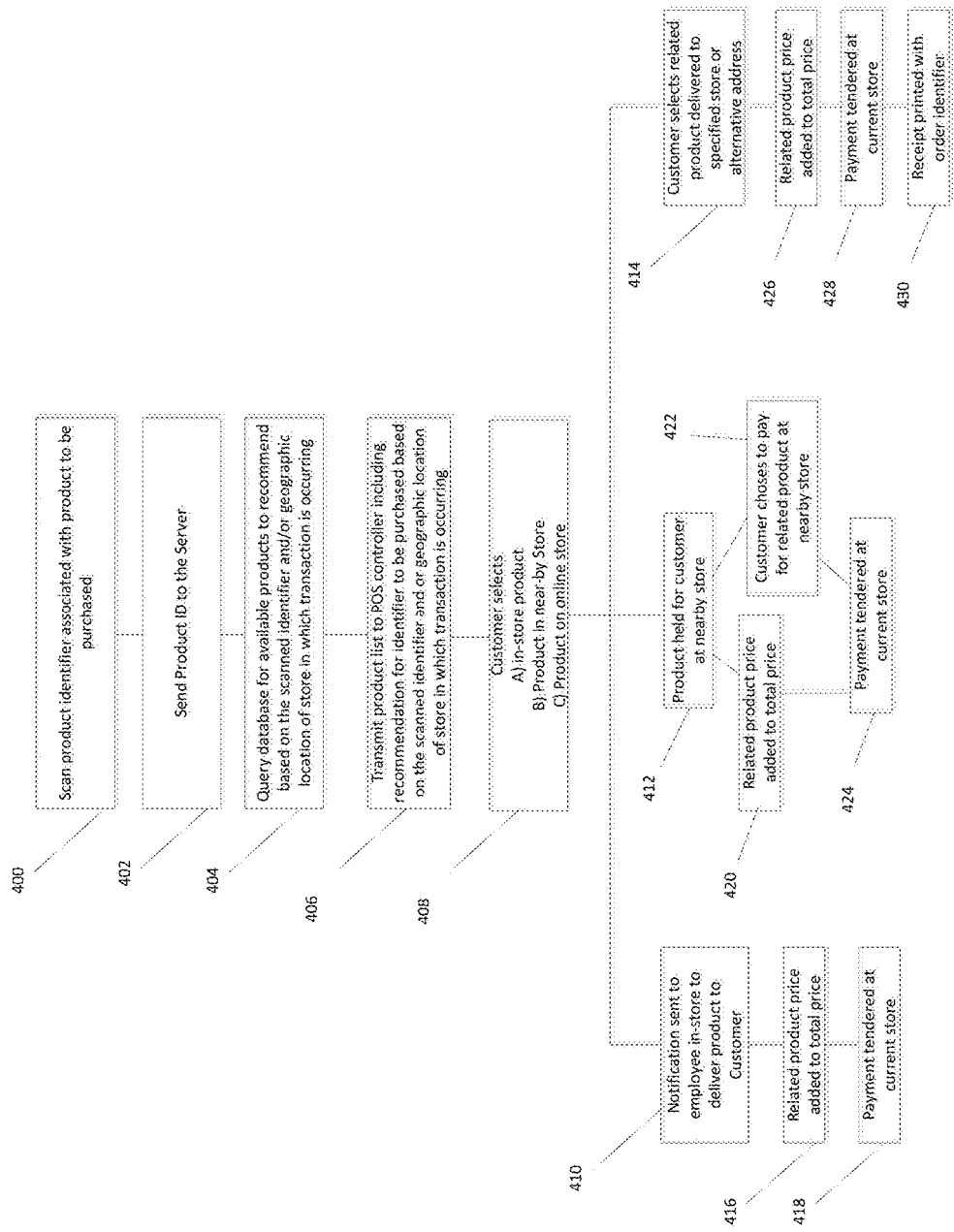
FIG. 4 is a flowchart describing the process of integrating online store with in-store shopping according to an exemplary embodiment.

FIG. 4 is a flow chart illustrating the process integrating online shopping and in-store shopping according to an exemplary embodiment. In exemplary embodiments, in operation 400 the customer/user scans an optical machine readable representation of a product at a cashier station using an optical scanner or scan gun. A product ID may be encoded in the optical machine readable representation.

In operation 402, the product ID may be decoded from the optical machine readable representation and transmitted to the server 310 by the POS controller 124. In exemplary embodiments the POS controller 124 may send the store location in which the product was scanned along with the product ID.

In operation 404, the server 310 queries the database 325 for available products to recommend based on the product identifier of the scanned product and store location of the store where the product was scanned. The database 325 may query the user database 335 using the product identifier, to search for products previously purchased contemporaneously with the scanned product. The database 325 may query the product database 330 to search for products recommended by the merchant of the scanned product. The database 325 may combine the results of the queries to form a list of recommended products. The database may query the inventory reporting system 345 using the location of the store in which the product was scanned for availability of the list of the recommended products. The inventory reporting system 345 may search for availability at the store in which the product was scanned, a store near by the store in which the product was scanned and/or the online store. The database 325 transmit the recommended products to the server 330.

In operation 406, the server 310 transmits at list of recommended products to the cashier station 100 for display. In exemplary embodiments the recommendation engine 340 may compile a list of recommended products received by the database 325. The server 310 may transmit the list to the POS controller 124 located at the cashier station 100. The POS controller may display the list of recommended products to the customer/user on the display 104.

In operation 408, the customer/user may interact with the display 104 to select a recommended product. In exemplary embodiments, the customer/user may select a recommended product available in the store in which the customer scanned the product, a recommended product available in a store nearby to the store in which the product was scanned, and/or available on the online store.

In exemplary embodiments, when the customer/user decides to purchase a recommended product available in the store in which the product was scanned, in operation 410, a notification may be sent (e.g., by the POS controller) to an employee of the store in which the product was scanned, to retrieve the desired recommended product for the customer/user. The employee may deliver the desired product to the customer/user at the cashier station 100. In operation 416, the price of the purchased related product is added to the total amount due by the POS controller, which can be displayed on the display 104. In operation 418 the customer/user may tender payment at the cashier station 100 of the current store in which customer/user is currently located.

In exemplary embodiments, when the customer/user decides to purchase a recommended product available at a store nearby to the store in which the product was scanned, in operation 412, the POS controller can instruct a server of the nearby store to notify its employees to hold the recommended product for the customer/user. In operation 420, the customer/user may select to pay for the related product at the store in which they are currently located. The price of the related product is added into the total amount due by the POS controller and in operation 424 the payment may be tendered at the cashier station 100 of the store in which the customer/user is currently located. In another embodiment, in operation 422 the customer/user may select to pay for the related product at the nearby store when the customer/user picks up the product. The price for the related product is not added to the total amount due and in operation 424 payment may be tendered at the cashier station 100 of the store in which the customer/user is currently located, not including the price of the related product to be purchased.

In exemplary embodiments, when user selects to purchase a recommended product available on the online store, in operation 414 the customer/user can select to have the purchased related product delivered to a specific store location or an alternative address (e.g., their home or business address). In operation 426, the price of the related product is added to the total amount due. In operation 428, payment is tendered at the store in which the customer/user is located. In operation 430, a receipt is printed for the customer/user including an order identification. The order identification may be presented to a store employee when the customer/user picks the purchased related product which is delivered to a store location. In another embodiment the order identification may be used to change or cancel the order on the online store.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for interfacing online e-commerce systems to integrate retail and online transactions, the system comprising:
    a server;
    a database;
    a cashier station located in a store, the cashier station including:
    a POS controller, an optical scanning device; a receipt printer, and a display;
    the optical scanning device, operatively coupled to the POS controller, (i) scans an optical machine readable representation of an in-store product to be purchased at the cashier station; and (ii) decodes a unique product identifier encoded in the optical machine readable representation;
    the POS controller, (i) transmits product identifier to the server; and (ii) transmits location of the store where the in-store product was scanned;
    the server, (i) receives the product identifier from the optical scanning device (ii) queries the database for recommended online products based on the scanned product and location of the store where the product was scanned; and (iii) transmits recommended online products information to POS controller to be displayed on the display of the cashier station;
    the POS controller (i) controls the display to render the recommended the online products information on the display; (ii) controls the display to provide an option to integrate purchase of the recommended online products with purchase the in-store product; (iii) consolidates purchase of the in-store product and the recommended online product into a single transaction at the cashier station; and (iv) controls the display to provide a total amount due after purchase of the in-store product and the recommended online product;
    the receipt printer, operatively coupled to the POS controller, prints a receipt in response to payment, wherein the receipt includes an order identifier corresponding to the recommended online product.

2. The system of claim 1, wherein the optical scanning device is a barcode scanner.

3. The system of claim 1, wherein the database includes a user database, a product database and an inventory reporting system.

4. The system of claim 1, wherein the recommended online products are those previously purchased contemporaneously with the in-store product whose product ID was input at the cashier station by other customers.

5. The system of claim 1, wherein the recommended online products are those suggested by the manufacturer for purchase with the in-store product whose product ID was input at the cashier station.

6. The system of claim 1, wherein the recommended online products are located in the store where the in-store product is scanned, in a different store located at a predetermined distance from the store where the in-store product was scanned, and an online store.

7. The system of claim 1, wherein the display displays an option to pick up the purchased recommended online product in-store.

8. The system of claim 1, wherein the display displays an option to input an alternative delivery address.

9. The system of claim 1, wherein the receipt printer prints on the receipt, an order information useable to access an online store order whereby an online store order can be modified.

10. A method for interfacing online e-commerce systems to integrate retail and online transactions, the system comprising:
    scanning, via an optical scanning device operatively coupled to a POS controller, an optical machine readable representation of an in-store product to be purchased at a cashier station;
    decoding, via the optical scanning device, a unique product identifier encoded in the optical machine readable representation;

transmitting, via the POS controller, the unique product identifier and location of store where the in-store product was scanned to a server;

receiving, on the server, the unique product identifier of the scanned product;

querying, by the server, a database for online products recommended based on the scanned product and location of store where product was scanned;

transmitting, via the server, to a display operatively coupled to the POS controller, information of the recommended online products;

receiving, on the display, information of the recommended online products from the server;

displaying, on the display, an option to integrate purchase of the recommended online products with purchase of the in-store product;

consolidating, on the display, purchase of the in-store product and the recommended online product into a single transaction at the cashier station;

displaying, on the display the total amount due after purchase of the in-store product and the recommended online product;

tendering, via a cashier station, the payment of total amount due;

printing, by a receipt printer operatively coupled to the POS controller, a receipt in response to payment, wherein the receipt includes an order identifier corresponding to the recommended online product.

11. The method of claim 10, wherein the optical scanning device is a barcode scanner.

12. The method of claim 10, wherein the database includes a user database, a product database and an inventory reporting system.

13. The method of claim 10, wherein the recommended online products are those previously purchased contemporaneously with the in-store product whose product ID was input at the cashier station by other customers.

14. The method of claim 10, wherein the recommended online products are those suggested by the manufacturer for purchase with the in-store product whose product ID was input at the cashier station.

15. The method of claim 10, wherein the recommended online products are located in the store where the in-store product is scanned, in a different store located at a predetermined distance from the store where the in-store product was scanned, and an online store.

16. The method of claim 10, wherein displaying on the display an option to pick up recommended online product in-store.

17. The method of claim 10, wherein the displaying on the display an option to input an alternative delivery address.

18. The method of claim 10, wherein printing on the receipt by the receipt printer, the order information useable to access an online store order whereby an online store order can be modified.

* * * * *